US005098235A

United States Patent [19]

Svetlik et al.

[11] Patent Number: 5,098,235

[45] Date of Patent: Mar. 24, 1992

[54] BIT STORAGE MEANS FOR DRILL PRESS

[75] Inventors: Kenneth N. Svetlik, Schaumburg; William H. Schultz, Northbrook; Jeffrey C. Ackerberg, LaGrange; Michael D. Murphy, Chicago, all of Ill.

[73] Assignee: Skil Corporation, Chicago, Ill.

[21] Appl. No.: 742,884

[22] Filed: Aug. 9, 1991

[51] Int. Cl.[5] .......... B23B 47/00

[52] U.S. Cl. .......... 408/234; 206/379; 211/69; 408/241 R

[58] Field of Search .......... 408/234, 241 R; 206/379; 211/69

[56] References Cited

U.S. PATENT DOCUMENTS

| | | | |
|---|---|---|---|
| 2,844,244 | 7/1958 | Hanson | 206/379 |
| 3,071,990 | 1/1963 | Uhtenwoldt | 408/241 |
| 3,154,192 | 10/1964 | Cowley | 206/379 |
| 3,248,167 | 4/1966 | Friedman | 206/379 |
| 4,780,030 | 10/1988 | Zudall | 408/234 |
| 4,932,294 | 6/1990 | Chang | 408/241 R |
| 4,954,026 | 9/1990 | Zurwelle | 408/241 R |
| 4,973,205 | 11/1990 | Spaulding | 408/241 R |

*Primary Examiner*—Daniel W. Howell
*Attorney, Agent, or Firm*—Jones, Day, Reavis & Pogue

[57] ABSTRACT

The housing of the drill press is provided with a bit storage compartment. A removable cover plate for the compartment has tabs on its inner surface for detachably holding a drill bit case of the type having two shell sections hingedly connected together with each of the shell sections provided with a rack containing arcuate recesses of progressively increasing size for detachably receiving drill bits of varying diameters. The tabs on the inside of the cover plate are adopted to hold the casing shell sections in their open position thereby to make all of the drill bits accessible upon opening of the cover plate or upon removal of the same from the housing of the drill press. A secondary drill bit holder is detachably and pivotally mounted in the storage compartment for swinging movement back and forth between an access position and a storage position.

7 Claims, 4 Drawing Sheets

BIT STORAGE MEANS FOR DRILL PRESS

FIELD OF THE INVENTION

The present invention relates to drill bit storage members for a power tool and in particular to drill bit storage members which are detachably mounted in a compartment formed in or on the housing of the power tool.

BACKGROUND OF THE INVENTION

It is known in the prior part to provide a drill bit storage device for a power tool, such as portable power tool in the form of a drill. This storage device includes a drill bit holder adapted to be mounted in the handle of the tool. This devise suffers from two principal disadvantages. First, the storage device must be completely separated from the power tool to permit access to the drill bits. Second, the device under consideration is capable of storing only a very limited number of drill bits.

It is also known in the prior art to provide various forms of casings or containers which contain a number of drill bits of varying sizes. These casings or containers are portable in nature and are completely separate from the tool which utilizes the drill bits. These devices are disadvantageous in that they often become lost or misplaced thus preventing ready access to the desired drill bit when needed to operate the associated drilling tool.

A very popular form of drill bit casing, and one which can be obtained from almost any hardware store, is of plastic construction and consists of two shell pieces hingedly connected to each other. Each shell piece includes a rack-like formation containing recesses of progressively increasing size to accommodate drill bits of varying diameters.

A need exists in the art to provide drilling devices, such as a drill press, for example, with means for storing a considerable number of drill bits of varying sizes in a readily accessible configuration in or on the housing of the power tool. A need also exists to provide such a storage device which can accommodate and utilize the popular and readily available type of drill bit casing referred to above.

SUMMARY OF THE INVENTION

The present invention relates to a drill bit storage compartment formed in the housing of a power tool, such as a drill press. The detachable cover for the compartment includes tabs on its inside surface for releasable, frictional engagement with the shell sections of a conventional tool bit casing for holding such sections in their open position thereby to store a plurality of drill bits in a readily accessible configuration. A secondary drill bit storage member is also mounted in the storage compartment for swinging movement between storage and access positions; this secondary drill bit storage member may be detached from the tool housing when desired.

DESCRIPTION OF THE INVENTION

Figure 1:
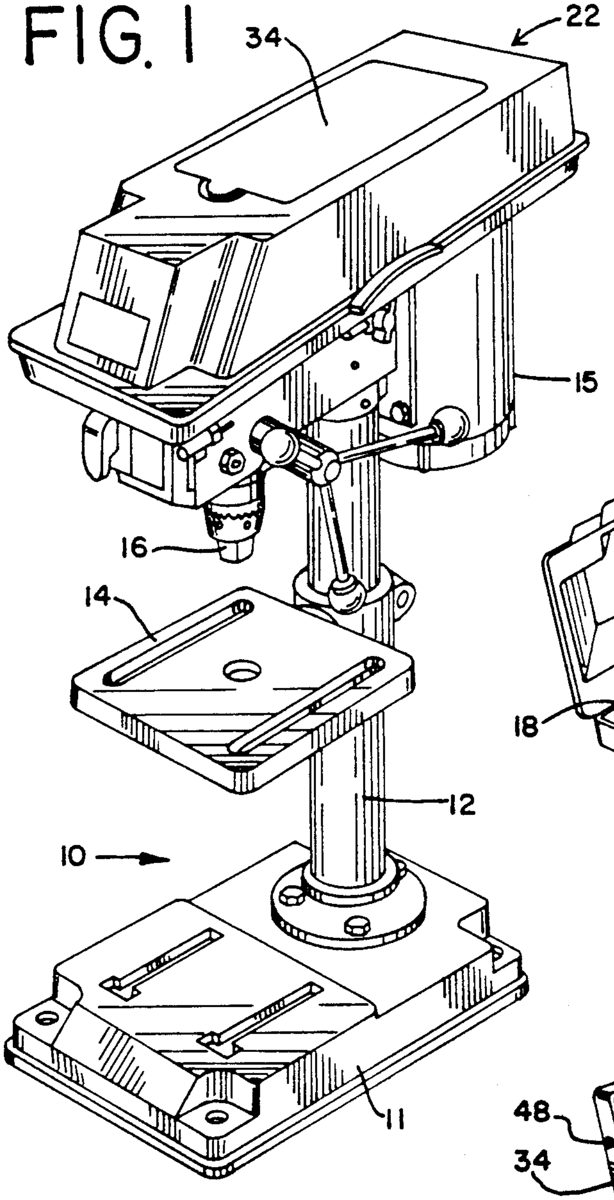
FIG. 1 is an isometric view of a drill press embodying the present invention.
Figure 2:
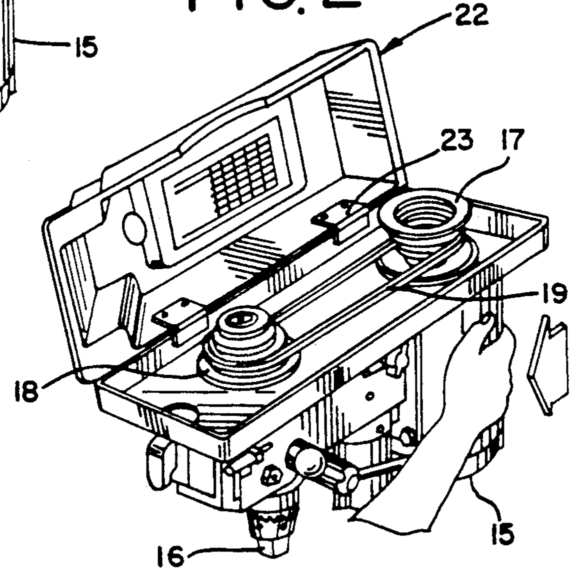
FIG. 2 is an isometric view showing the drill press housing portion containing the present invention swung to its open position for providing access to the belt and pulleys of the drill press.

Referring particularly to FIG. 1, a drill press embodying the present invention is generally designated 10. The drill press includes a base 11 mounting a support column 12. A work table 14 is adjustably mounted by the column 12. Column 12 also supports a motor assembly including an electric motor contained within housing 15 for driving the drill chuck 16 through pulleys 17, 18 and a drive belt 19 (FIG. 2). The drill press also includes a housing member in the form a a pulley cover generally designated 22. As will be noted in FIG. 2, the pulley cover 22 is mounted to the motor assembly by a pair of hinges 23 thereby to permit the pulley cover to be swung to an open position for adjustment and tensioning of the drive belt 19. The various components thus far described are well know in the art and require no further discussion.

Turning now to the present invention, the housing portion 22 includes a compartment 25 defined by a bottom wall 26, side walls 27, a rear wall 28 and a front wall 29, the latter communicating with a recess 30 formed in the top wall 31 of the pulley cover 22. Access to the compartment 25 is provided by a removable cover plate 34 having a plurality of hinge formations 35 adapted to be received within respective openings 36 formed in the wall 31 of the pulley cover 22. Hinge formations 35 are configured such that the cover 34 may be swung back and forth between open and closed positions and detached from the pulley cover when desired.

Cover plate 34 includes side walls 38 and a front wall 39, the latter supporting a flexible tongue 40 adapted to be received within a recess 41 (FIG. 8) formed in the front wall 29 of the compartment 25 adjacent the recess 30. The interengagement between the tongue 40 and recess 41 serves as means for releasably holdling the cover plate 34 in its closed position.

Figure 4:
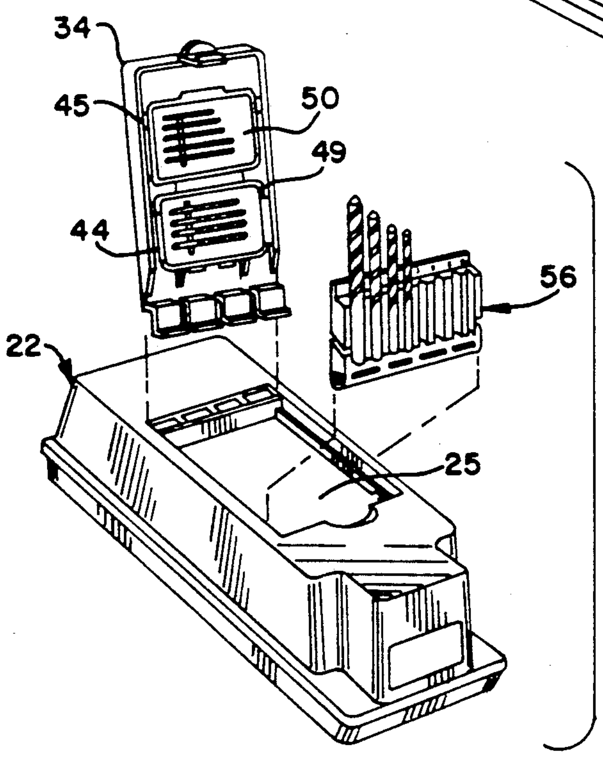
FIG. 4 is an isometric view similar to FIG. 3 and showing the drill bit storage members separated from the housing portion of the drill press.
Figure 11:
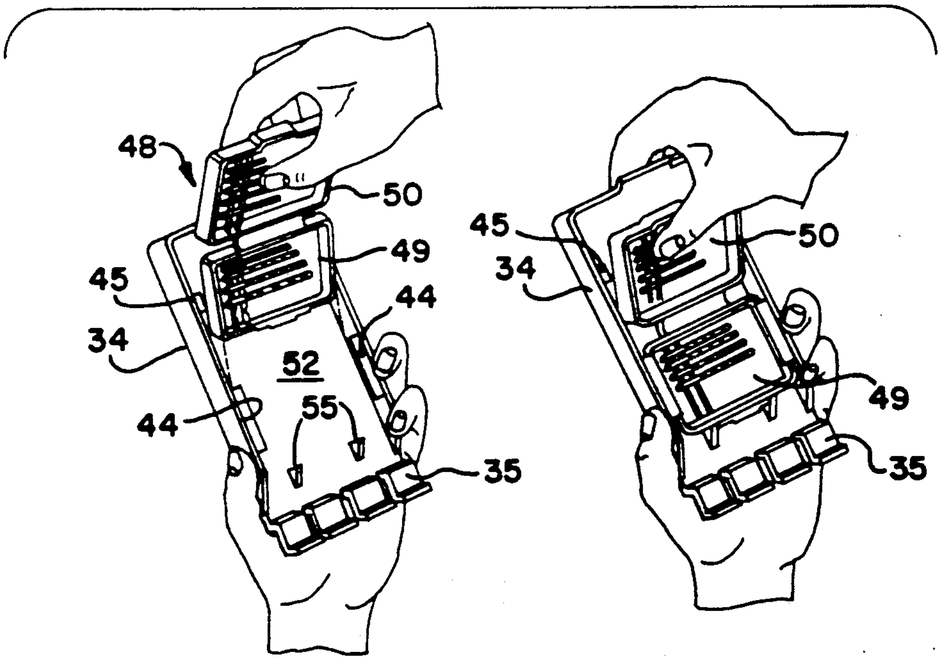
FIG. 11 is an isometric view showing the manner in which a conventional drill bit storage member is mounted to the inside surface of the cover plate for the storage compartment formed in the drill press housing.

As best seen in FIGS. 4 and 11, the side walls 38 of the cover plate are formed with first and second sets of tabs 44 and 45 for releasably mounting a drill bit case, generally designated 48. This drill bit case is well known in the art; various versions of this case are readily available through almost all hardware stores. A rectilinear version is disclosed for purposes of illustration and is made of plastic construction and includes housing shell pieces 49, 50 which are hingedly secured to each other. Each shell section is provided with a rack-like series of arcuate recesses of progressively increased size for supporting drill bits of varying diameters.

Figure 3:
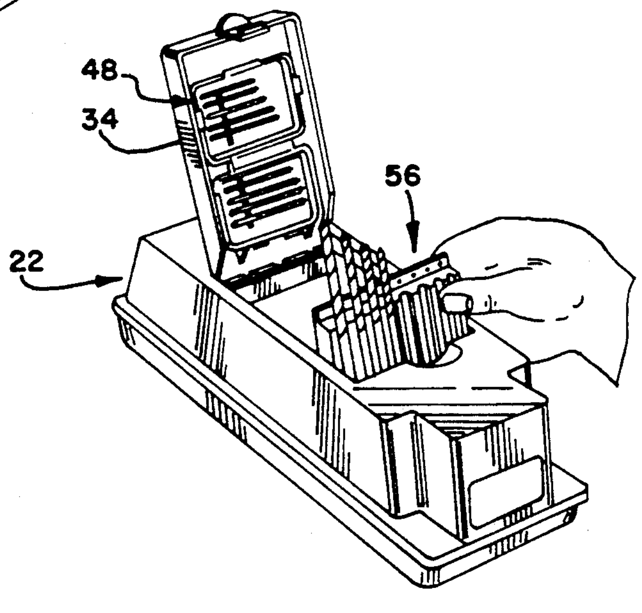
FIG. 3 is an isometric view of the drill press housing member showing the various drill bit storage members in their access positions.
Figure 5:
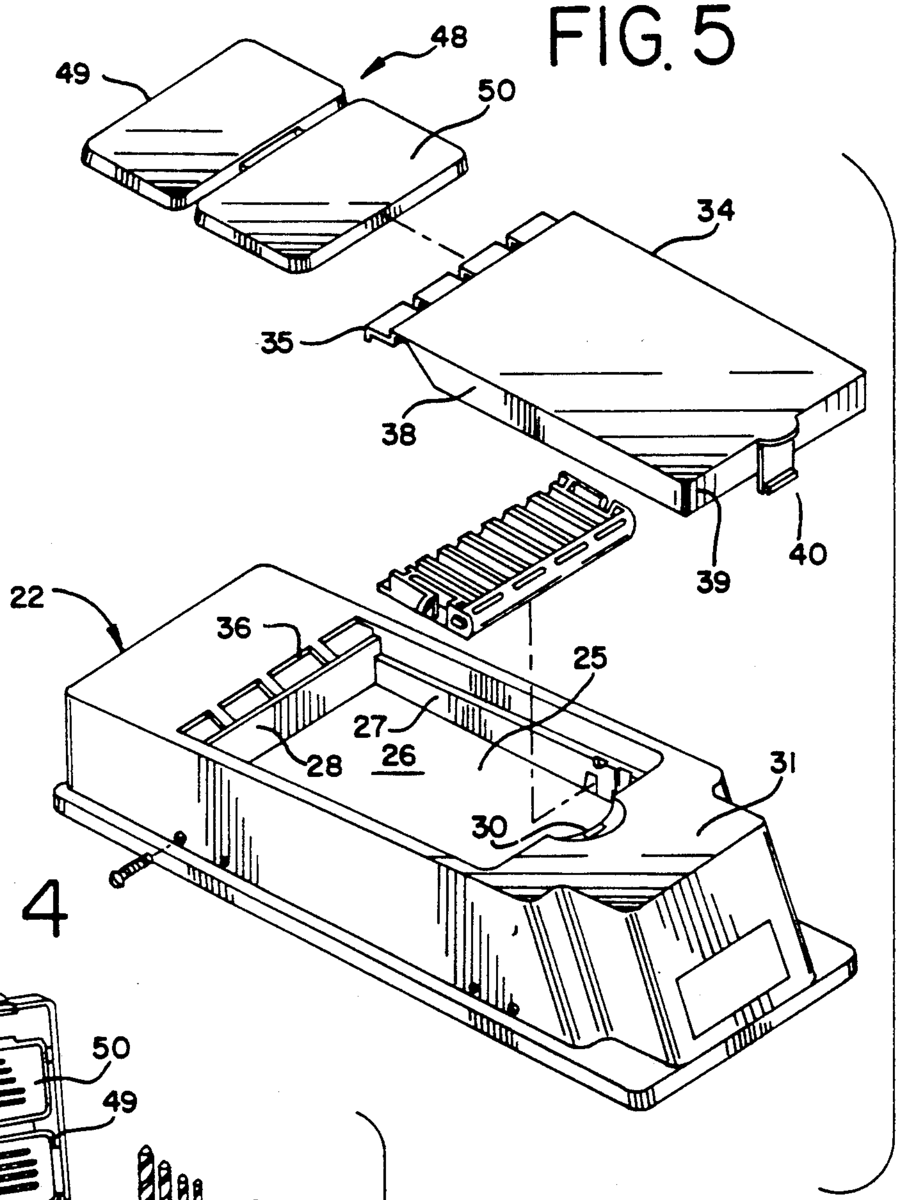
FIG. 5 is an exploded isometric view showing the principal components of the present invention.

The tabs 44 are formed in spaced relationship with the inside surface 52 of the cover plate 34. Thus, one of the shell sections 49, 50 of the drill bit case may be slid under the tabs 44 as best seen in FIG. 11. Stops 55 formed on the surface 52 of the cover plate are provided for limiting the amount of movement of the drill bit case 48 as one of its sections slide under the tabs 44. After one of the shell sections is secured beneath the tabs 44, the other section of case 48 is snapped under the tabs 45 as seen in FIGS. 4 and 11. Both the tabs and the shell section of the carrying case will deflect to permit the drill bit case to be held in place as seen in FIG. 4 and readily removed when desired. The drill bits in the casing 48 are readily accessible when the cover plate 34 is supported on the housing 22 in the open position of the cover plate as seen in FIG. 3. If desired, the cover plate 34 may be entirely removed from the housing portion 22 as seen in FIG. 4.

The present invention further includes a secondary or auxillary drill bit holder, generally designated 56. The drill bit holder 56 includes a body member 57 provided with a plurality of arcuate recesses 58 which progressively increase in size to accommodate drill bits of varying diameters. The body member 57 is preferably formed of flexible material, such a suitable plastic, to permit the drill bits to slide into place within the recesses 58.

Figure 7:
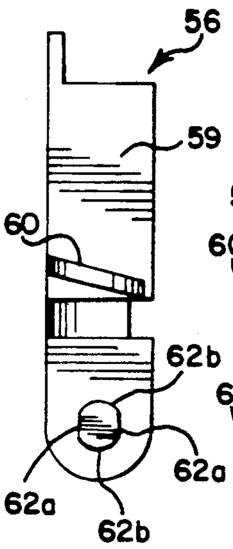
FIG. 7 is an end view of the drill bit member of FIG. 6 taken along the line 7—7 of FIG. 6.
Figure 6:
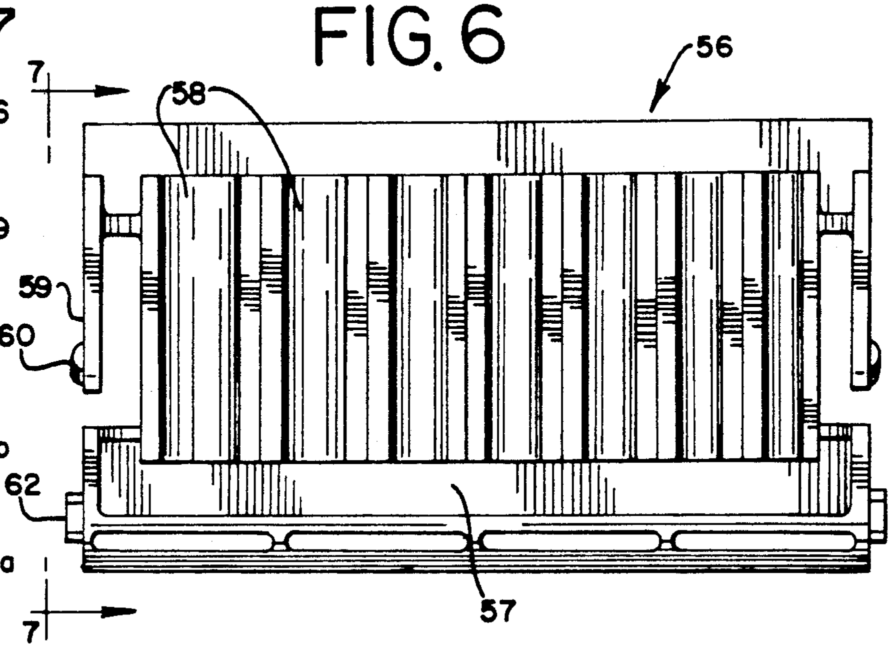
FIG. 6 is a front view of one of the drill bit storage members.

As noted in FIGS. 6 and 7, one end of the body member 57 is provided with a flexible, cantilevered arm 59 mounting a projection 60. This end of the body member also includes a hinge pin 62. As noted in FIG. 7, the hinge pin 62 includes opposed planar walls 62*a* and opposed arcuate end walls 62*b*. At this point it should be mentioned that the other end of the body member 57 is of identical but opposite hand construction to that just described.

Figure 8:
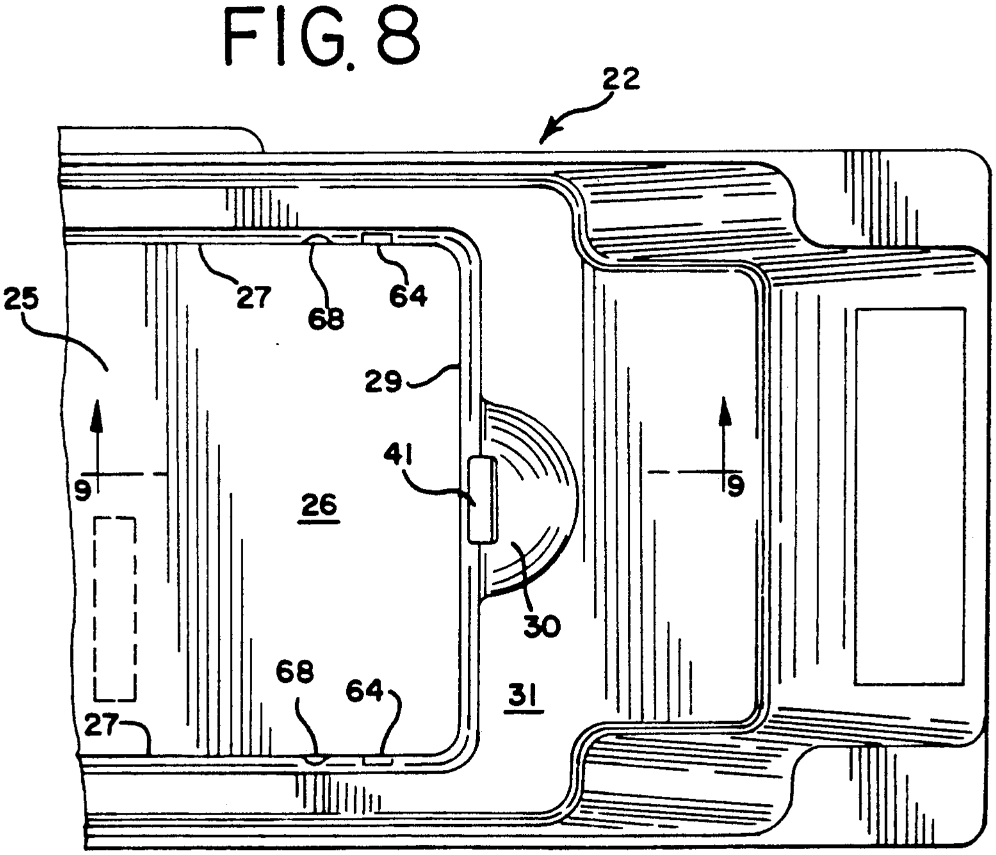
FIG. 8 is a fragmentary top plan view of the housing portion of the drill press with the cover plate and drill bit storage members removed.
Figure 9:
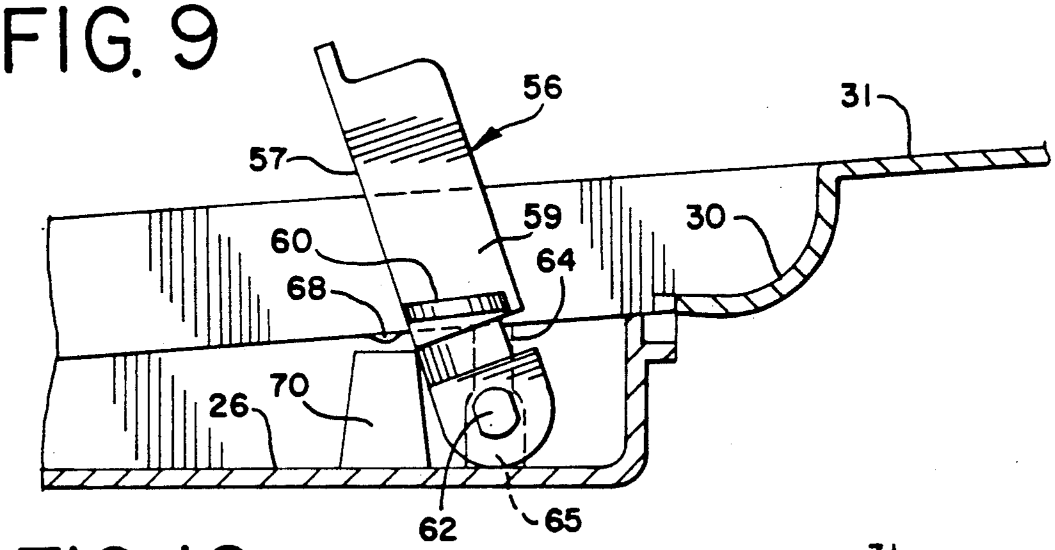
FIG. 9 is a section taken along the line 9—9 of FIG. 8 and showing one of the drill bit storage members in its access position.
Figure 10:
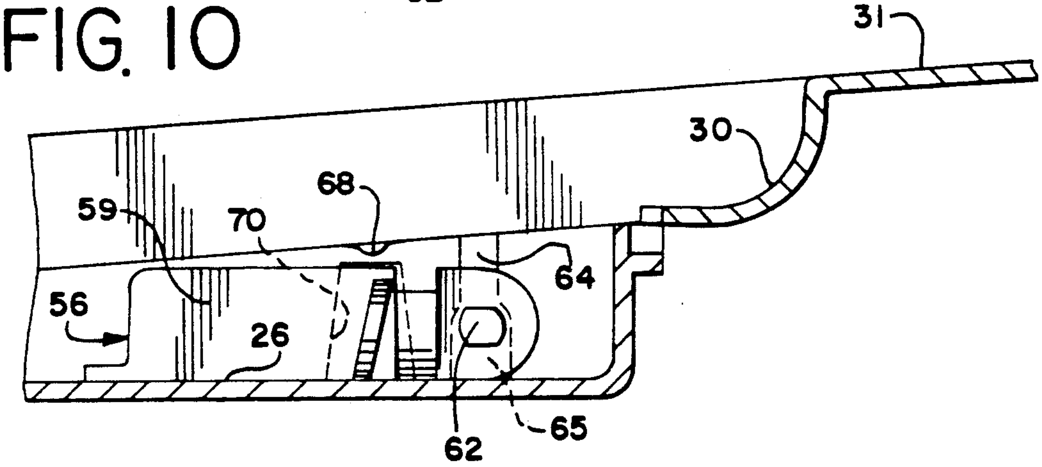
FIG. 10 is a section similar to FIG. 9 but showing one of the drill bit storage members in its storage position.

Referring to FIGS. 8 through 10, each side wall 27 of the compartment 25 is provided with a vertically disposed slot consisting of a neck portion 64 and an expanded portion 65. The distance between the planar hinge pin surfaces 62*a* is slightly less than the width of the slot 64 thus permitting the hinge pins 62 to be received within the neck portions 64 when the body 57 of the drill bit holder 56 is oriented in a plane substantially 90 degrees to a plane containing the wall 26 of the compartment 25. After the hinge pins 62 are received within the slot portions 65, the drill bit holder 56 may be rotated to the position shown in FIG. 9. Since the distance between the extremities of the arcuate hinge pin wall portions 62*b* is greater than the width of slot portion 64, the drill bit holder 56 may not be separated from the housing portion 22 when the holder is in inclined positions, such as the positions illustrated in FIGS. 9 and 10.

Each of the walls 27 is further provided with a recess 68. When the drill bit holder 56 is swung to its access position, as seen in FIG. 9, the projections 60 on the body portion 57 will be received within the recesses 68 for releasably holding the drill bit holder 56 in its access position.

Each of the side walls 27 is also provided with a recess 70. When the drill bit holder 56 is moved in a counterclockwise direction (as seen in FIGS. 9 and 10), cantilever arms 59 will flex allowing the projections 60 to snap into and be received within the recesses 70, thus allowing the drill bit holder 56 to be swung to its storage position as shown in FIG. 10. When the drill bit holder 56 is swung to its storage position, it will be disposed in a contigous and somewhat nested relationship with the drill bit casing 48 after the cover 34 is swung to its closed position.

Accordingly, it is seen that the present invention includes the drill bit holder 56 which may be readily swung from the access and storage positions shown in FIGS. 9 and 10, respectively. Alternatively, the drill bit holder 56 may be separated from the compartment 25 of the tool housing 22 as seen in FIG. 4. Further, the invention includes means for utilizing the conventional drill bit case 48 and for storing the same in the housing compartment 25 along with the auxillary drill bit holder 56. When the cover plate 34 and the drill bit holder 56 are removed from the pulley cover 22, the remaining compartment 25 can be used to hold a different bit case which the operator may own.

While the invention has been described in connection with a preferred embodiment, it is not intended to limit the scope of the invention to the particular form disclosed herein. On the contrary, it is intended to cover such alternatives, modifications, and equivalents as may be included within the spirit and scope of the invention as defined by the appended claims.

We claim:

1. In a power tool of the type having a chuck for receiving drill bits of varying diameters, which drill bits are contained, when not in use, in a casing having first and second shell sections hingedly connected to each other for movement between open and closed positions, wherein each shell section has a series of arcuate recesses of progressively increased size for frictionally engaging respective drill bits of varying diameters, the improvement comprising:

(a) a housing portion of said power tool being provided with a cavity in the surface thereof defining a bit storage compartment;

(b) a cover plate movably connected to said housing portion for opening and closing said compartment; and (c) said cover plate including first and second sets of tabs on its inside surface for respective, releasable, frictional engagement with said first and second shell sections of a tool bit casing for holding said sections in their open position for storing a series of drill bits in said compartment in a readily accessible configuration.

2. The improvement according to claim 1 wherein said cover plate and said housing portion are provided with respective hinge formations for hingedly connecting said cover plate to said housing portion and for permitting detachment of the cover plate from the housing portion.

3. The improvement according to claim 1 further defined by:

(a) a secondary drill bit holder in the form of a body member configured with a plurality of receptacles of progressively increased size for releasably retaining respective drill bits of varying diameters;

(b) said housing portion having opposed wall formations defining a portion of said bit storage compartment; and (c) second hinge means connecting said secondary drill bit holder to said wall formations for swinging movement of said holder back and forth between a storage position in said compartment in contiguous relationship with said drill bit casing when said cover plate is in its closed position and an access position when said cover plate is in its open position.

4. The improvement according to claim 2 further defined by:

(a) a secondary drill bit holder in the form of a body member configured with a plurality of receptacles of progressively increased size for releasably retaining respective drill bits of varying diameters;

(b) said housing portion having opposed wall formations defining a portion of said bit storage compartment; and (c) second hinge means connecting said secondary drill bit holder to said wall formations for swinging movement of said holder back and forth between a storage position in said compartment in contiguous relationship with said drill bit casing when said cover plate is in its closed position and an access position when said cover plate is in its open position.

5. The improvement according to claim 3 wherein said second hinge means are configured to permit separation of said secondary drill bit holder from said housing when the former is in a predetermined position.

6. The improvement according to claim 4 wherein said second hinge means are configured to permit separation of said secondary drill bit holder from said housing when the former is in a predetermined position.

7. The improvement according to claim 1 wherein said housing portion is in the form of a pulley cover for a drill press.

* * * * *